(12) United States Patent
Michel et al.

(10) Patent No.: US 9,712,255 B2
(45) Date of Patent: Jul. 18, 2017

(54) SYSTEM AND METHOD FOR PROVIDING UNDERWATER COMMUNICATION DATA

(71) Applicant: ALCATEL LUCENT, Boulogne Billancourt (FR)

(72) Inventors: Ronan Michel, Nozay (FR); Cyril Brzozowski, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 7 days.

(21) Appl. No.: 14/442,523

(22) PCT Filed: Nov. 22, 2013

(86) PCT No.: PCT/EP2013/074483
§ 371 (c)(1),
(2) Date: May 13, 2015

(87) PCT Pub. No.: WO2014/082932
PCT Pub. Date: Jun. 5, 2014

(65) Prior Publication Data
US 2016/0294482 A1   Oct. 6, 2016

(30) Foreign Application Priority Data
Nov. 30, 2012   (EP) .................................... 12306489

(51) Int. Cl.
*H04B 10/00*   (2013.01)
*H04B 10/80*   (2013.01)
(Continued)

(52) U.S. Cl.
CPC ............. *H04B 10/808* (2013.01); *H04B 3/36* (2013.01); *H04B 3/52* (2013.01); *H04B 10/29* (2013.01)

(58) Field of Classification Search
CPC .......... H04B 10/808; H04B 3/36; H04B 3/52; H04B 10/29
See application file for complete search history.

(56) References Cited

U.S. PATENT DOCUMENTS 4,952,798 A * 8/1990 Graham ................. G02B 6/266
250/227.11
4,979,793 A * 12/1990 Bowen ................. G02B 6/4246
250/227.16

(Continued)

FOREIGN PATENT DOCUMENTS

CN   101356750 A   1/2009
CN   101836378 A   9/2010
(Continued)

OTHER PUBLICATIONS

European Search Report dated Apr. 23, 2013, 7 pages.

*Primary Examiner* — Danny Leung
(74) *Attorney, Agent, or Firm* — H. Shamsaei Far

(57) ABSTRACT

A system and a method for communication in a submarine communication network are disclosed. The communication system comprises a branching unit, an optical cable segment comprising a first conductor path and a second conductor path, a repeater and an insulation and loopback circuit. The branching unit is configured for enabling exchange of optical communication data and electric power between an optical trunk cable of the submarine communication network and the cable segment. The insulation and loopback circuit is configured to receive the optical communication data and the electric power through said first conductor path, direct at least a part of said electric power back to the trunk cable through said second conductor path and the branching unit, and direct said optical communication data to a remote platform through a third conductor path.

11 Claims, 2 Drawing Sheets

(51) Int. Cl.
*H04B 3/36* (2006.01)
*H04B 3/52* (2006.01)
*H04B 10/29* (2013.01)

(56) References Cited

U.S. PATENT DOCUMENTS

| | | | | |
|---|---|---|---|---|
| 4,982,083 A * | 1/1991 | Graham | | G02B 6/266 |
| | | | | 250/227.11 |
| 5,214,312 A * | 5/1993 | Inoue | | H04B 3/44 |
| | | | | 307/112 |
| 5,526,157 A * | 6/1996 | Kawano | | H04B 10/032 |
| | | | | 398/1 |
| 5,532,478 A * | 7/1996 | Kogure | | H04B 3/44 |
| | | | | 250/227.24 |
| 6,333,940 B1 * | 12/2001 | Baydar | | H04J 3/1611 |
| | | | | 370/466 |
| 6,714,394 B1 * | 3/2004 | Kumayasu | | H04B 10/806 |
| | | | | 361/62 |
| 6,768,833 B2 * | 7/2004 | Farnham | | H04B 10/806 |
| | | | | 385/24 |
| 8,559,773 B2 * | 10/2013 | Kordahi | | G02B 6/4428 |
| | | | | 385/101 |
| 9,143,845 B2 * | 9/2015 | Aida | | H04B 3/44 |
| 2003/0151521 A1 * | 8/2003 | Horinouchi | | H04B 10/806 |
| | | | | 340/850 |
| 2011/0188803 A1 * | 8/2011 | Kordahi | | G02B 6/4428 |
| | | | | 385/24 |
| 2011/0311186 A1 * | 12/2011 | Adams | | G02B 6/3879 |
| | | | | 385/78 |
| 2013/0202285 A1 * | 8/2013 | Lecroart | | H04B 3/44 |
| | | | | 398/1 |
| 2016/0294482 A1 * | 10/2016 | Michel | | H04B 10/808 |

FOREIGN PATENT DOCUMENTS

| | | | |
|---|---|---|---|
| EP | 2270967 A1 | 1/2011 | |
| EP | 2393220 A1 | 12/2011 | |
| EP | 2393222 A1 | 12/2011 | |
| EP | 2523356 A1 | 11/2012 | |

* cited by examiner

SYSTEM AND METHOD FOR PROVIDING UNDERWATER COMMUNICATION DATA

The present invention relates to underwater communications.

BACKGROUND

One example of an underwater communication network is the so-called submarine network. Typically in a submarine network, one or more branching units are used to create a branch typically configured for providing connection between a branch station and the optical backbone of the submarine network. One application of using branching unit(s) in submarine networks is to aggregate a series of branches from oil and gas platforms or stations to a submarine backbone. Additional branching units, or dormant branching units, may be inserted on the backbone to connect unplanned platforms to the submarine backbone at later stages after the initial deployment.

SUMMARY

However, the aggregation of such additional (unplanned) platforms may prove problematic. Indeed, in occasions the exact location of the platform to be aggregated to the network may not be known at the time of building the submarine backbone.

The term platform as used herein is to be understood to encompass any end station which is on a shore or on a fixed or a floating structure above or under the sea level.

In cases where a need arises at a time after the backbone is installed, for example on the sea bed, to aggregate a new platform to the backbone, it may become very difficult or even practically impossible (due to signal attenuation or degradation) to perform such aggregation because the platform may be located at a very large distance from the initial backbone routing. As mentioned above, an aggregation of a platform to the backbone is typically accomplished by adding a branching unit at a convenient location on the backbone and extending a branch from the branching unit to the platform. However, there are limitations in extending such branch to the platform.

One such limitation is due to the fact that the communication data propagating along the branch typically undergoes attenuation. In the known submarine systems, a branch is typically installed in a repeaterless configuration. The term repeaterless is known in the related art as referring to a segment of submarine cable which does not have a repeater installed thereupon to perform functions such as regeneration, reshaping and/or re-amplification of the communication data. As the known branches extending from branching units are typically repeaterless, the length of such branches may only be limited to a distance in which the power of the signal conveyed in the branch maintains an acceptable level after undergoing attenuation.

Furthermore, for safety reasons or for observing corrosion issues, the platforms used for oil & gas applications are typically not permitted to receive high electric power-feeding (especially of high voltages as typically used in submarine communication systems, e.g. about or over 10 KV). Therefore, an attempt to boost up the electric power in the branch so as to enable the communication data to reach the platform is typically discarded due to such safety or corrosion reasons.

As in conventional submarine networks branches are repeaterless, the maximum branch length is set mainly by the optical power budget from the platform to the first optical amplifier on the backbone. Of course, real line design is more complex and requires further considerations.

As a solution to the above problem, additional optical unrepeated boosting or Raman pumping mechanism may be used from the platform to increase the branch length. However, this solution typically only provides some level of improvement in signal boosting which may be capped to certain limits and/or may not be sufficient for long-distance branching requirements.

Some embodiments of the disclosure feature a communication system for use in a submarine communication network comprising an optical trunk cable, the communication system comprising a branching unit, an optical cable segment comprising a first conductor path and a second conductor path, a repeater and an insulation and loopback circuit wherein the branching unit is configured for enabling exchange of optical communication data and electric power between the optical trunk cable and the cable segment, and the insulation and loopback circuit is configured to receive said optical communication data and said electric power through said first conductor path, direct at least a part of said electric power back to the trunk cable through said second conductor path and the branching unit, and direct said optical communication data to a remote platform through a third conductor path.

According to some specific embodiments, the insulation and loopback circuit is configured to receive an optical communication data from said remote platform and direct said optical communication data to said trunk cable through said second conductor path and the branching unit.

According to some specific embodiments, the insulation and loopback circuit comprises a bridging path configured for directing at least a part of said electric power back to the trunk cable through said second conductor path and the branching unit, According to some specific embodiments, the first conductor path and the second conductor path are comprised in a dual-conductor optical cable.

According to some specific embodiments, the branching unit comprises a switch configured for connecting and disconnecting the optical cable segment from the optical trunk cable.

According to some specific embodiments, the insulation and loopback circuit is configured for being connected to sea earth.

Some embodiments of the disclosure feature a method for communication in a submarine communication network comprising an optical trunk cable, the method comprising:
  receiving from the trunk cable an optical communication data and an electric power through a first conductor path;
  directing at least a part of said received electric power back to the trunk cable through a second conductor path; and
  directing said received optical communication data to a remote platform through a third conductor path.

According to some specific embodiments, the method further comprises receiving an optical communication data from said remote platform and directing said optical communication data to said trunk cable through said second conductor path and the branching unit According to some specific embodiments, the method further comprises connecting or disconnecting said first conductor path and said second conductor path from the optical trunk cable.

According to some specific embodiments, the method further comprises connecting the insulation and loopback circuit to sea earth.

These and further features and advantages of the present invention are described in more detail, for the purpose of illustration and not limitation, in the following description as well as in the claims with the aid of the accompanying drawings.

DETAILED DESCRIPTION

Figure 1:
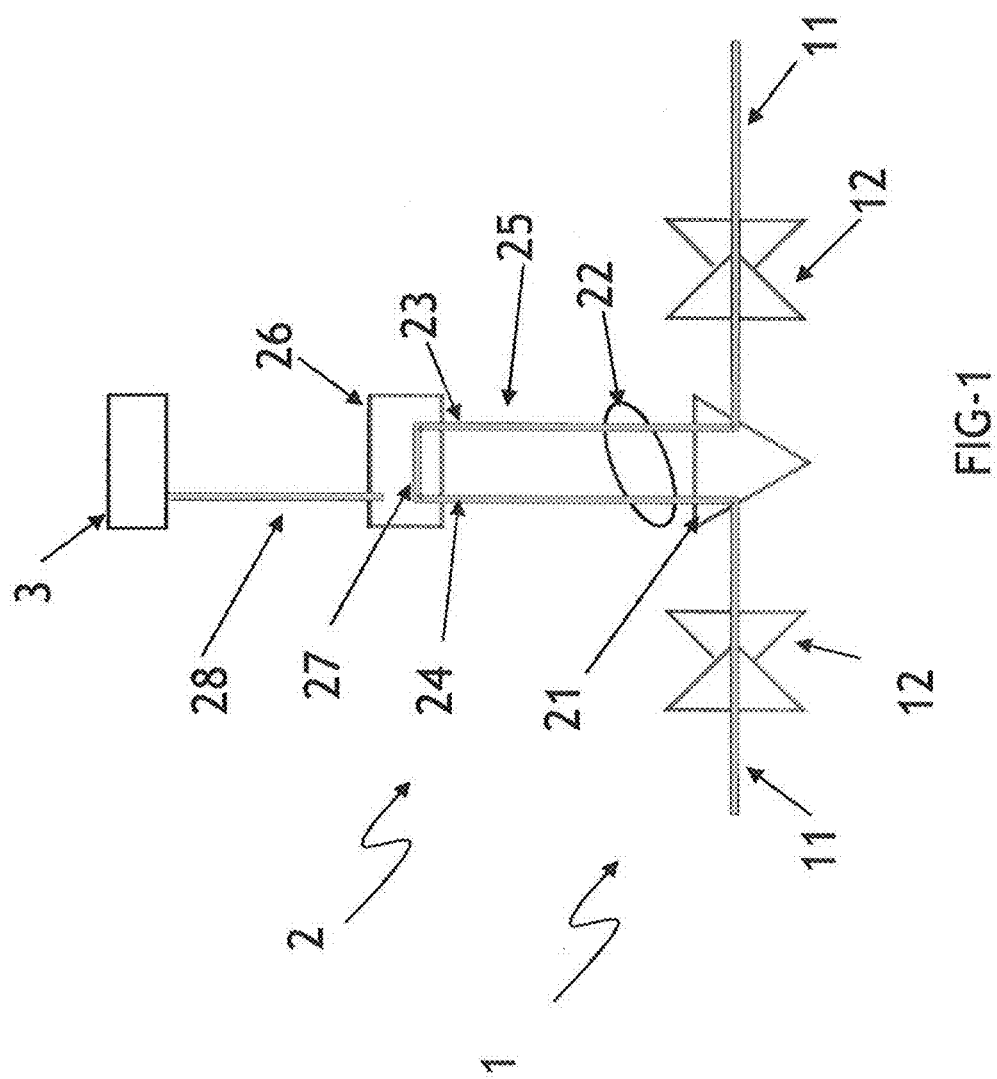
FIG. 1 is an exemplary schematic representation of a communication system according to some embodiments connected to a submarine communication network.

In FIG. 1 there is shown an exemplary submarine communication network 1 to which a communication system 2 according to some embodiments of the disclosure is connected. The submarine network 1 may be any of any suitable type, including a submarine network already deployed under water.

The submarine network 1 may comprise a trunk cable 11 and one or more repeaters 12. The trunk cable may convey optical communication data and electric power from an end station to another end station on different ends of the trunk cable 11 (the end stations are not shown). The one or more repeaters 12 may perform functions such as re-amplification, regeneration and reshaping of the optical signal as it propagates from one end station to another, thereby compensating for any signal attenuation or degradation during propagation. The submarine network 1 may further comprise other elements and components which are not shown in FIG. 1 because they are not relevant for the understanding of the present description.

According to the present disclosure, a communication system 2 may be added to the submarine network 1 at any position along the trunk cable 11 (also referred to as backbone) as will be described below. The communication system 2 is configured to allow exchange of optical communication data between the trunk cable 11 and a remote station 3, herein referred to as a platform. Optionally the communication system 2 may also be configured to supply electric power to the platform, although such electric power may be considerably lower than the power (voltage) available on the trunk cable 11. The may be particularly useful in cases where a subsea node is the platform to be supplied.

The communication system 2 comprises a branching unit 21 configured to allow exchange of optical communication data between the trunk 11 and the platform 3. The branching unit 21 may be installed at any convenient location along the trunk cable 11. In practice the location of the branching unit 21 may mainly depend on the location of the platform 3 so as to advantageously select a location which is convenient for a particular design (for example the location closest to the platform 3).

The communication system 2 further comprises an optical cable segment 22 comprising a first conductor path 23 and a second conductor path 24. The optical cable segment is connected at one end to the branching unit 21 and at another end to an insulation and loopback circuit 26. The first conductor path 23 may be configured to convey optical communication data from the trunk cable 11 through the branching unit 21 to the insulation and loopback circuit 26 and the second conductor path 24 may be configured to convey optical communication data from the insulation and loopback circuit 26 to the trunk cable 11 through the branching unit 21. Other configuration may also be envisaged.

The insulation and loopback circuit 26 may be located at a position sufficiently close to the platform 3 such that optical communication data propagating from the insulation and loopback circuit 26 to the platform 3 does not suffer attenuation or degradation more than an acceptable level.

The term acceptable level for a possible attenuation or degradation of the communication data may vary from case to case. Such level may therefore be determined by a person skilled in the related art according to the specific requirements of each application.

In order to compensate for signal attenuation and/or degradation as it propagates along the length of the optical cable segment 22, the communication system 2 further comprises one or more repeaters 25 installed along the length of the optical cable segment 22. The one or more repeaters 25 may be configured to perform operations such as re-amplification, regeneration and reshaping on the optical signal comprising the optical communication data. The number of the repeaters 25 to be installed on the optical cable segment 22 may be determined according to the requirements of each specific application so as to ensure that the optical communication data reaches the insulation and loopback circuit 26 with acceptable signal quality. The optical cable segment 22 may therefore convey sufficient electric power to feed the repeaters along its length from the branching unit 21 to the insulation and loopback circuit 26.

The insulation and loopback circuit 26 is configured for receiving the optical communication data from the branching unit 21 through the first conductor path 23 and forwarding said optical communication data to the platform 3. Furthermore, the insulation and loopback circuit 26 is configured for looping (redirecting) the received electric power back to the branching unit 21 and thus to the trunk cable 11 through the second conductor path 24. The operation of the insulation and loopback circuit 26 will be described in further detail with reference to FIG. 2.

The optical communication data (sufficiently repeatered along the propagation through the first conductor path to maintain an acceptable level of signal quality) received by the insulation and loopback circuit 26 is then forwarded from the latter to the platform 3 by way of a conductor path 28 which may be an optical cable.

On the other hand the electric power received by the insulation and loopback circuit 26 is looped back, by way of a loopback path 27 provided in the insulation and loopback circuit 26, to the branching unit 21 through the second conductor path 24.

In this manner a serial connection is provided between the trunk cable 11, the branching unit 21, the first conductor path 23, the loopback path 27 and the second conductor path 24 back to the branching unit 21 and the trunk cable 11. This serial connection provides the possibility of conveying electrical power to the repeaters along the length of the optical cable segment, while at the same time it ensures insulation of the platform from the high voltage available on the submarine network thereby avoiding risks related to the safety of the operators and/or issues related to corrosion on the platform. This configuration also ensures that the optical communication data is conveyed sufficiently close to the platform 3 with acceptable signal quality from where it may be forwarded conveniently to the platform 3

It is to be noted that the first conductor path and second conductor path may physically be part of one single optical cable (comprising electrical conductor and optical conductor). In such case, the single optical cable may be spliced at the insulation and loopback circuit to direct the optical signal toward the platform and loopback the electric power toward the branching unit.

Alternatively, the first conductor path and second conductor path may physically be part of two separate optical cables (each comprising electrical conductor and optical conductor). In such case, the optical signal received at the insulation and loopback circuit from the first conductor path is directed the optical signal toward the platform and the electric power is looped back toward the branching unit by way of an electrical connection from the electrical conductor of the first conductor path to the electrical conductor of the second conductor path.

Preferably the optical cable segment 22 comprises a dual-conductor optical cable. Dual-conductor optical cables are known. Such cables provide the possibility of providing bi-directional connection (both data and power) along the length of only one cable. One advantage of using dual-conductor optical cables in the solution proposed herein is therefore that only one cable needs to be installed for the required functionalities; whereas otherwise one would need to install one optical cable for communication from the branching unit 21 to the insulation and loopback circuit 26 and another optical cable for communication from the insulation and loopback circuit 26 back to the branching unit 21. Therefore the use of a dual-conductor optical cable reduces deployment costs not only related to the length of the cable itself, but also related to marine work involving the use of a ship with the associated costs of equipment and personnel for laying the optical cables on sea bed.

Figure 2:
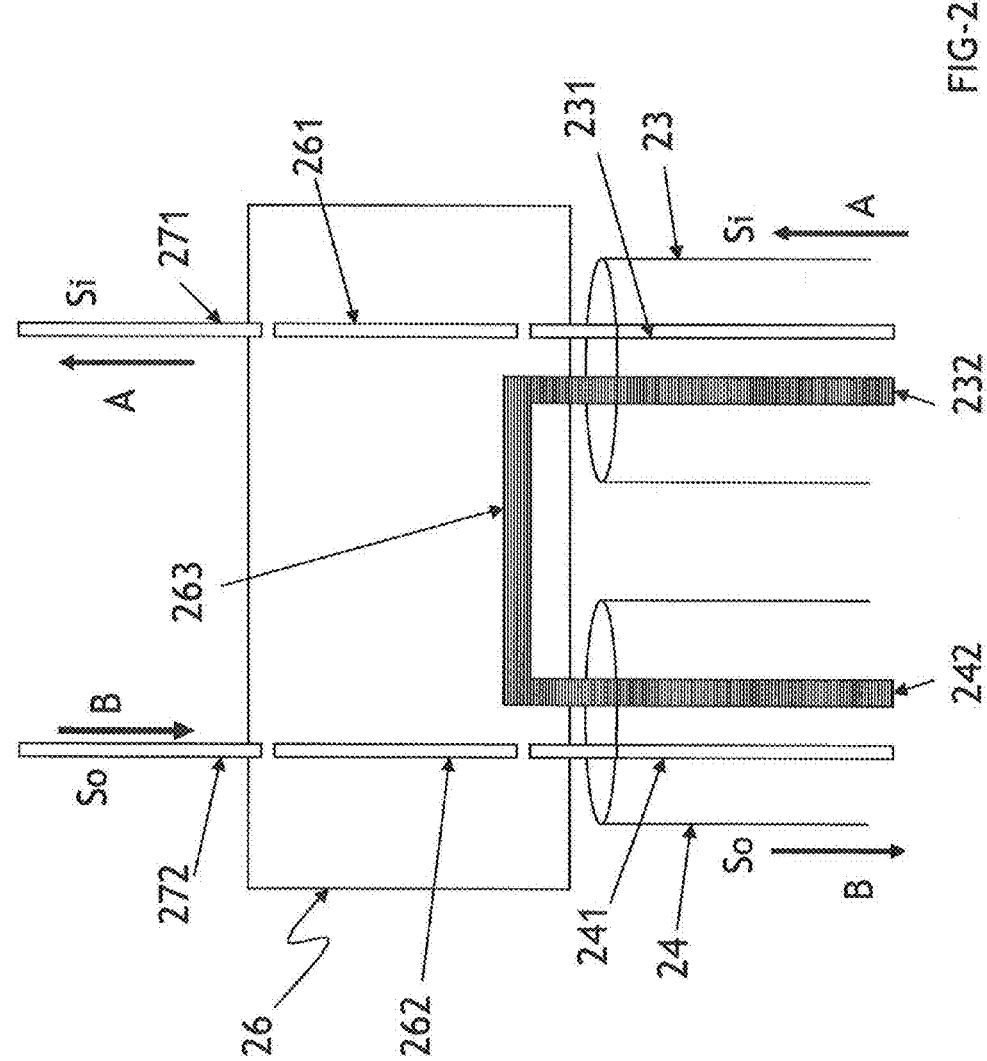
FIG. 2 is an exemplary schematic representation of an insulation and loopback circuit according to some embodiments.

FIG. 2 illustrates an exemplary schematic representation of an insulation and loopback circuit 26 according to some embodiments. Here again only those elements that are relevant for the understanding of the present disclosure are shown and it is understood that the insulation and loopback circuit 26 may have any additional elements required for each specific use.

As discussed with reference to FIG. 1, the insulation and loopback circuit 26 receives optical communication data and electric power through the first conductor path 23 and transmits optical communication data and electric power through the second conductor path 24. Each of the first and the second conductors paths 23, 24 may comprise a respective optical conductor 231 and 241, such as an optical fiber, and a respective electrical conductor 232 and 242, such as a metallic wire.

The insulation and loopback circuit 26 may comprise a first optical transmission path 261 and a second optical transmission path 262 which may be of any type of optical waveguide; and a loopback electrical conductor 263 (as part of the loopback path 27 in FIG. 1) such as a metallic wire.

In operation the insulation and loopback circuit 26 receives an optical signal $S_i$ from the branching unit 21 (FIG. 1) through the optical conductor 231 (herein also referred to as first input optical conductor) and receives electric power from the branching unit 21 (FIG. 1) through the electrical conductor 232 (herein also referred to as input electrical conductor). Such optical signal and electric power received by the insulation and loopback circuit 26 may have passed through as many repeaters 25 as necessary on the first conductor path 23 from the branching unit to the insulation and loopback circuit 26.

The optical signal $S_i$ is intended to be input into the platform 3. This is performed by forwarding the optical signal $S_i$ from the insulation and loopback circuit 26. Upon reception at the insulation and loopback circuit 26 the optical signal $S_i$ received from the first input optical conductor 231 is directed by way of an the optical transmission path 261 toward a first output optical conductor 271 configured to direct the optical signal $S_i$ toward the platform 3 (FIG. 1). The direction of propagation of the optical signal $S_i$ from the branching unit to the insulation and loopback circuit and from the latter to the platform is shown in FIG. 2 by way of arrow A.

In the opposite direction of propagation, namely from the platform to the insulation and loopback circuit and from the latter to the branching unit, an optical signal $S_o$ is output from the platform 3 (FIG. 1) and input into the insulation and loopback circuit 26 through the second input optical conductor 272. The optical signal $S_o$ output from the platform 3 may comprise the same wavelength(s) as the wavelength(s) comprised in the optical signal $S_i$ which was input in the platform 3. Alternatively, the optical signal $S_o$ output from the platform 3 may comprise wavelength(s) which is (are) different from the wavelength(s) comprised in the optical signal $S_i$ which was input in the platform 3.

Upon reception at the insulation and loopback circuit 26 the optical signal $S_o$ received from the second input optical conductor 272 is directed by way of an optical transmission path 262 toward a second output optical conductor 241 of the second conductor path 24 which is configured to direct the optical signal $S_o$ toward the branching unit 21 (FIG. 1). The direction of propagation of the optical signal $S_o$ from the platform to the insulation and loopback circuit and from the latter to the branching unit is shown in FIG. 2 by way of arrow B.

In this manner bi-directional optical transmission between the platform 3 and the trunk (backbone) cable 11 is ensured.

As already mentioned above, the first conductor path 23 also comprises an electrical conductor 232 which may convey high electric power, i.e. in the range of tens of Kilovolts. It is desired that this electric power does not reach the platform 3. In this regards, the insulation and loopback circuit 26 is configured to loopback the electric power received from the electrical conductor 232. This is achieved by means of a bridging path 263 (as being comprised in a loopback path 27 as descried with reference to FIG. 1) in the insulation and loopback circuit 26 which bridges all or a portion of the electric power present on the electrical conductor 232 to the electric conductor 242 in the second conductor path 24. The amount of the electric power looped back to the second conductor path may depend on whether a part of the received electric power is used to run the internal circuitry of the insulation and loopback circuit 26, should this be the case, a portion of the electric power is looped back.

In this manner high power is looped back to the branching unit 21 and from the latter to the trunk cable 11 and the platform is therefore maintained insulated from the risk of receiving such high electric power.

In some embodiments, the optical cable segment (22 in FIG. 1) may itself have one or more sub-branches. For example, the optical cable segment 22 may have a branching unit along its own length (not shown in the figure) configured to allow exchange of optical communication data between the optical cable segment 22 (which in this case could be regarded as a trunk cable) and another platform (not shown) located at a location which is different from the platform 3. In such case, the sub-branch may comprise repeaters as well as an insulation and loopback circuit in similar fashion as described in relation to FIGS. 1 and 2.

The proposed solution therefore allows repeatered extension of the submarine network 1 to any platform 3 located at any distance from the trunk cable of the submarine network 1, thus also allowing network extension to platform locations which were not planned at the time of backbone routing and installation.

In case of a failure in the optical cable segment, such as broken cable and shunt to the sea, one or more electrical switches may be used in the branching unit 21 to disconnect or otherwise isolate the faulty branch from the trunk cable 11 and to interconnect the portions of the trunk cable 11 connected to the branching unit from different end stations (e.g. trunk cables 11 at both sides of the branching unit 21 in FIG. 1), allowing for repair of the faulty branch while maintaining traffic on the backbone.

In such cases, the one or more switches in the branching unit may disconnect the faulty branch from the backbone and connect it to the sea.

It is to be noted that the list of structures corresponding to the claimed means is not exhaustive and that one skilled in the art understands that equivalent structures can be substituted for the recited structure without departing from the scope of the invention.

It is also to be noted that the order of the steps of the method of the invention as described and recited in the corresponding claims is not limited to the order as presented and described and may vary without departing from the scope of the invention.

It should be appreciated by those skilled in the art that any block diagrams herein represent conceptual views of illustrative circuitry embodying the principles of the invention.

The invention claimed is:

1. A communication system for use in a submarine communication network comprising an optical trunk cable, the communication system comprising a branching unit, an optical cable segment comprising a first conductor path and a second conductor path, a repeater and an insulation and loopback circuit wherein the branching unit is configured for enabling exchange of optical communication data and electric power between the optical trunk cable and the cable segment, and the insulation and loopback circuit is configured to receive said optical communication data and said electric power through said first conductor path, direct at least a part of said electric power back to the trunk cable through said second conductor path and the branching unit, and direct said optical communication data to a remote platform through a third conductor path.

2. The communication system of claim 1, wherein the insulation and loopback circuit is configured to receive an optical communication data from said remote platform and direct said optical communication data to said trunk cable through said second conductor path and the branching unit.

3. The communication system of claim 1, wherein the insulation and loopback circuit comprises a bridging path configured for directing at least a part of said electric power back to the trunk cable through said second conductor path and the branching unit.

4. The communication system of claim 1, wherein the first conductor path and the second conductor path are comprised in a dual-conductor optical cable.

5. The communication system of claim 1, wherein the branching unit comprises a switch configured for connecting and disconnecting the optical cable segment from the optical trunk cable.

6. The communication system of claim 1, wherein the insulation and loopback circuit is configured for being connected to sea earth.

7. The communication system of claim 1, wherein the optical cable segment has one or more sub-branches, wherein a sub-branch comprises a branching unit configured to allow exchange of optical communication data between the optical cable segment and a second platform located at a location being different from said remote platform, one or more repeaters and an insulation and loopback circuit.

8. A method for communication in a submarine communication network comprising an optical trunk cable, the method comprising:
    receiving, at an insulation and loopback circuit, from the trunk cable an optical communication data and an electric power through a first conductor path;
    directing, by said insulation and loopback circuit, at least a part of said received electric power back to the trunk cable through a second conductor path; and
    directing, by said insulation and loopback circuit, said received optical communication data to a remote platform through a third conductor path.

9. The method of claim 8 further comprising receiving an optical communication data from said remote platform and directing said optical communication data to said trunk cable through said second conductor path and the branching unit.

10. The method of claim 8 further comprising connecting or disconnecting said first conductor path and said second conductor path from the optical trunk cable.

11. The method of claim 8, further comprising connecting the insulation and loopback circuit to sea earth.

* * * * *